(12) United States Patent
Neibert

(10) Patent No.: US 7,828,964 B1
(45) Date of Patent: Nov. 9, 2010

(54) POOL FILTER CLEANER

(76) Inventor: Paul D. Neibert, 192 Eppinger Dr., Port Charlotte, FL (US) 33953

( * ) Notice: Subject to any disclaimer, the term of this patent is extended or adjusted under 35 U.S.C. 154(b) by 0 days.

(21) Appl. No.: 12/805,220

(22) Filed: Jul. 19, 2010

Related U.S. Application Data

(63) Continuation-in-part of application No. 12/466,061, filed on May 14, 2009.

(60) Provisional application No. 61/282,479, filed on Feb. 18, 2010.

(51) Int. Cl.
*B08B 3/02* (2006.01)
*B01D 29/68* (2006.01)

(52) U.S. Cl. .................. 210/167.12; 134/198

(58) Field of Classification Search ............ 210/167.11, 210/167.12, 167.14, 198.1, 416.1, 416.2; 134/198
See application file for complete search history.

(56) References Cited

U.S. PATENT DOCUMENTS

| | | |
|---|---|---|
| 2,028,690 A | 1/1936 | Schamer et al. |
| 2,980,256 A | 4/1961 | Nash |
| 3,969,248 A | 7/1976 | Whitmer |
| 4,130,124 A | 12/1978 | Sherwin |
| 5,203,990 A | 4/1993 | Gargiulo |
| 5,384,045 A | 1/1995 | Chmielewski et al. |
| 5,989,419 A | 11/1999 | Dudley et al. |
| 6,152,155 A | 11/2000 | Milligan |
| 6,156,213 A | 12/2000 | Dudley et al. |
| 6,709,581 B2 | 3/2004 | Leckal |
| 7,311,823 B2 | 12/2007 | Brooke |
| 2002/0011259 A1 | 1/2002 | Pociask |
| 2002/0189988 A1 | 12/2002 | Alexander et al. |
| 2004/0047675 A1 | 3/2004 | Bonelli et al. |
| 2006/0060544 A1* | 3/2006 | Brooke ................. 210/791 |

FOREIGN PATENT DOCUMENTS

| | | | |
|---|---|---|---|
| JP | 06045306 A | | 2/1994 |
| JP | 2001-259557 A | * | 9/2001 |

\* cited by examiner

*Primary Examiner*—Fred Prince
(74) *Attorney, Agent, or Firm*—Richard C. Litman

(57) ABSTRACT

The pool filter cleaner is a device for simultaneously cleaning the interior and exterior surfaces of a conventional cylindrical pool filter. The pool filter cleaner includes first and second elongated pipes, each having an upper end and a lower end. A hose connector provides fluid connection between an external hose, the upper end of the first elongated pipe and a first end of a cross pipe. A second end of the cross pipe is in fluid communication with the upper end of the second elongated pipe. A sprinkler head is mounted on the lower end of the first elongated pipe, and a nozzle is mounted on the lower end of the second elongated pipe. A cap is slidably mounted on the first elongated pipe, the cap being adapted for covering and sealing an upper opening of the pool filter when the sprinkler head is inserted within the pool filter.

20 Claims, 4 Drawing Sheets

POOL FILTER CLEANER

CROSS-REFERENCE TO RELATED APPLICATION

This application is a continuation-in-part application of U.S. patent application Ser. No. 12/466,061, filed May 14, 2009, pending, and also claims the benefit of U.S. Provisional Patent Application Ser. No. 61/282,479, filed Feb. 18, 2010.

BACKGROUND OF THE INVENTION

1. Field of the Invention

The present invention relates to cleaning systems and to filters, and particularly to a pool filter cleaner for simultaneously cleaning interior and exterior surfaces of a pool filter.

2. Description of the Related Art

Many swimming pools utilize a pump that recirculates the water through pleated paper filter cartridges. These filters commonly consist of a parallel array of cylindrical elements annularly arranged about a central, cylindrical passage. The filter elements are periodically removed from the filter housing and then manually cleaned, often through immersion in a chlorine-containing solution, by spraying with a garden hose, or through brushing. Such manual cleaning, however, is time consuming and tedious, particularly since the interior and exterior surfaces of the filter must be cleaned separately. Thus, a pool filter cleaner solving the aforementioned problems is desired.

SUMMARY OF THE INVENTION

The pool filter cleaner allows for the simultaneous cleaning of interior and exterior surfaces of a conventional cylindrical pool filter. The pool filter cleaner includes first and second elongated pipes, each of the pipes having an upper end and a lower end. A hose connector is provided, the hose connector being a substantially T-shaped connector. The hose connector has a hose attachment port adapted for releasable attachment to an external hose, along with first and second ports. The upper end of the first elongated pipe is secured to the first port of the hose connector.

A cross pipe having opposed first and second ends is attached to the second port of the hollow hose connector. The second end of the cross pipe is attached to a substantially L-shaped hollow elbow having first and second fluid openings. The second end of the cross pipe is attached to the first fluid opening, and the upper end of the second elongated pipe is attached to the second fluid opening thereof.

A sprinkler head is mounted on the lower end of the first elongated pipe, and a nozzle is mounted on the lower end of the second elongated pipe. A cap is slidably mounted on the first elongated pipe, the cap being adapted for covering and sealing an upper opening formed through the pool filter. In use, the sprinkler head and a lower portion of the first elongated pipe are inserted within a central passage of the pool filter through the upper opening, the cap covering and sealing the upper opening. The nozzle and a lower portion of the second elongated pipe are supported external to the pool filter. Pressurized water supplied through the external hose flows through the sprinkler head and the nozzle to simultaneously clean the interior surface and the exterior surface, respectively, of the pool filter. Preferably, a support bar is further provided, the support bar having opposed first and second ends. The first end of the support bar is secured to the cap, and the second end of the support bar is slidably mounted on the second elongated pipe.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
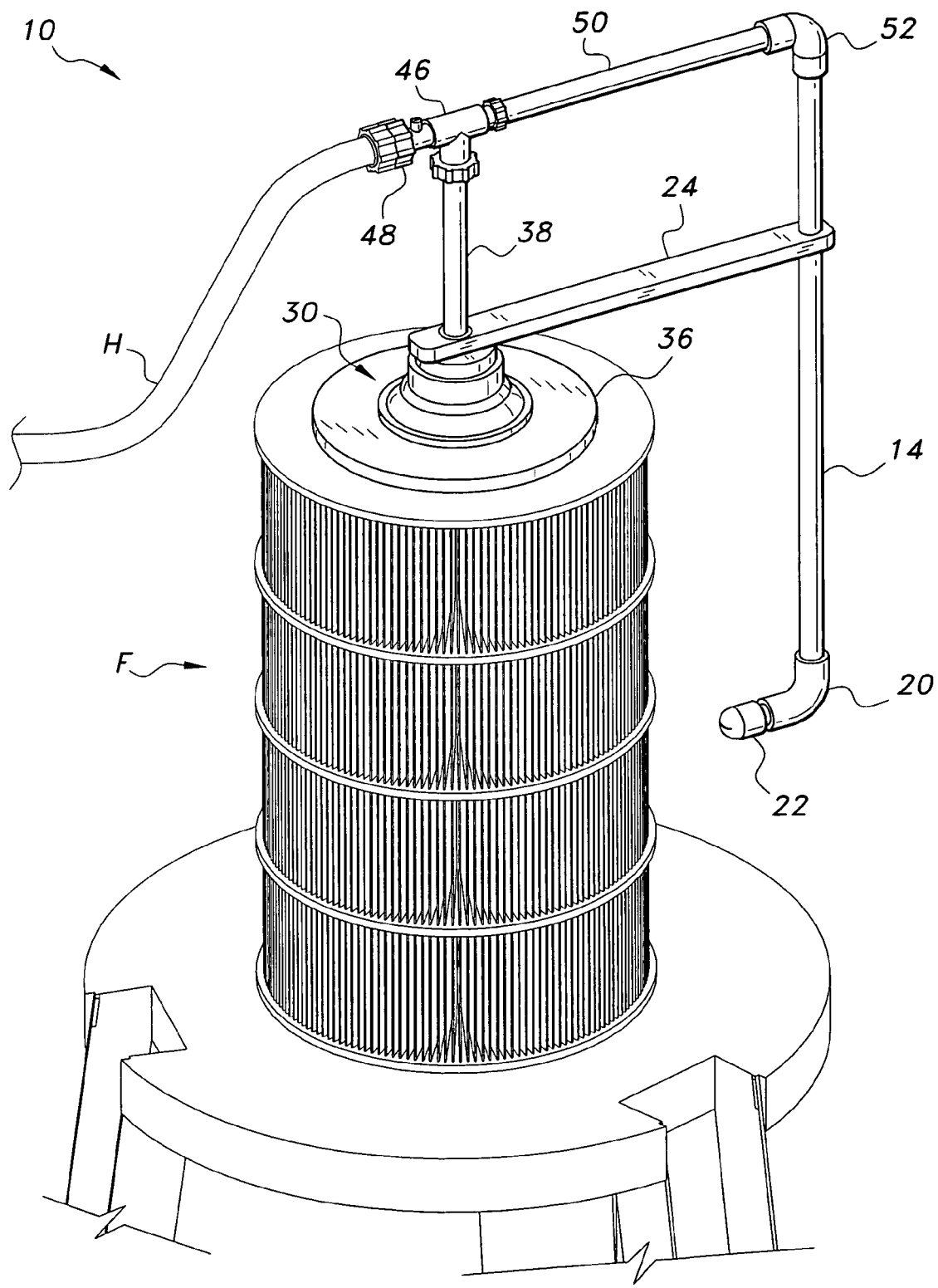
FIG. 1 is an environmental, perspective view of a pool filter cleaner according to the present invention.
Figure 2:
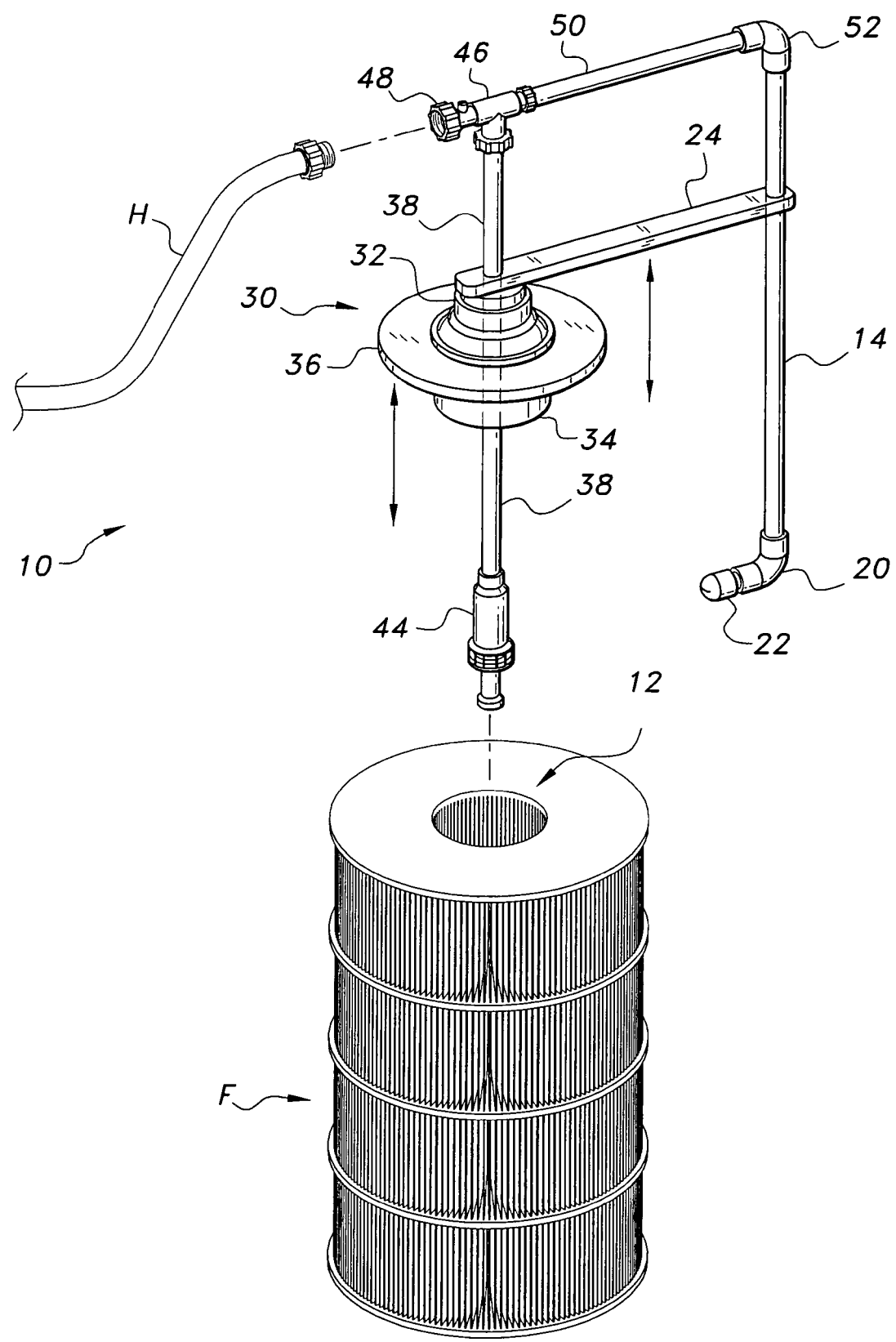
FIG. 2 is an environmental, perspective view of the pool filter cleaner according to the present invention, illustrating the pool filter cleaner above the pool filter.
Figure 3:
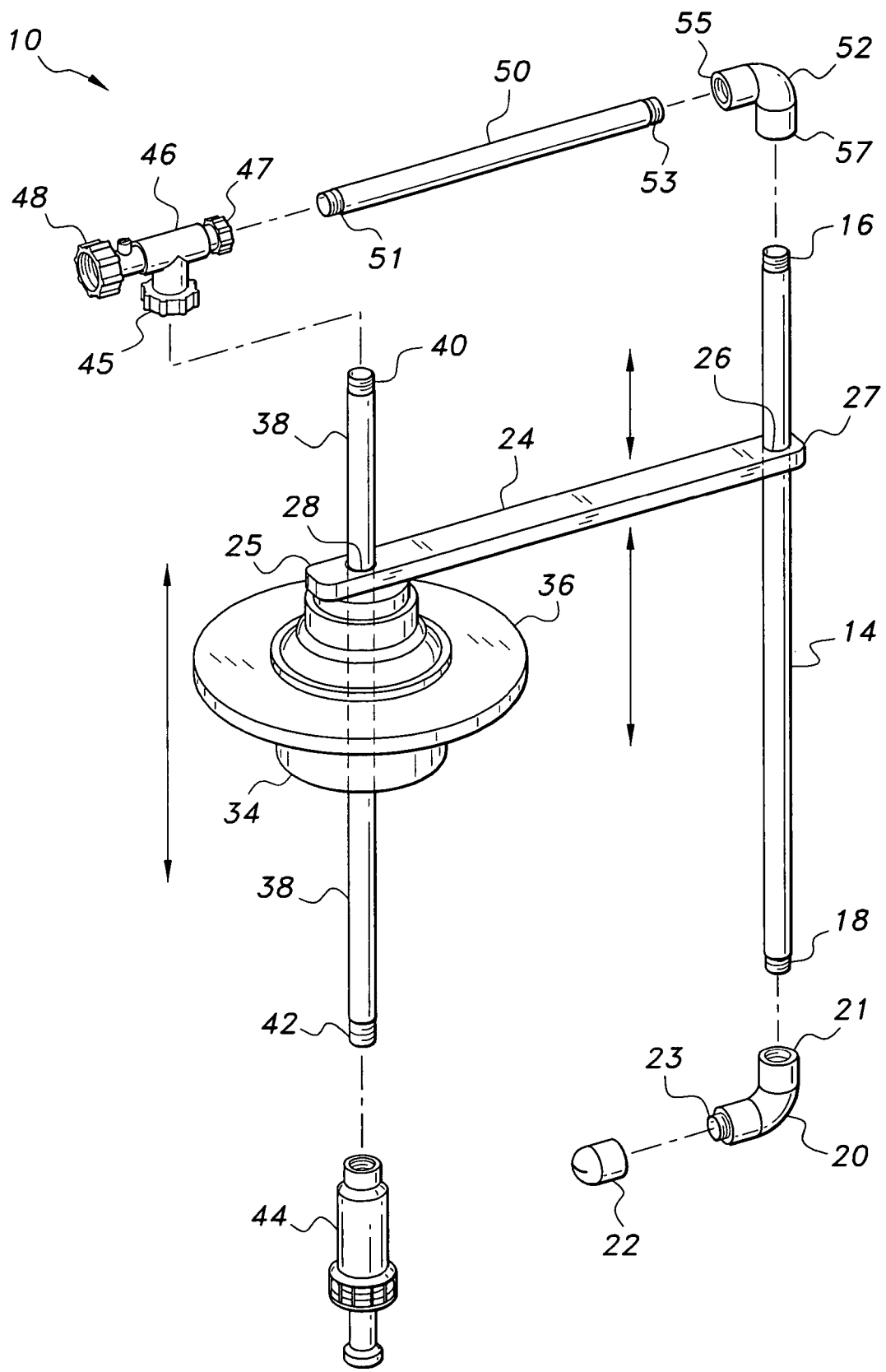
FIG. 3 is an exploded view of a first embodiment of a pool filter cleaner according to the present invention.

Referring to FIGS. 1 and 2, the pool filter cleaner 10 is a device for simultaneously cleaning the interior and exterior surfaces of a conventional cylindrical pool filter, such as the exemplary filter F shown in the drawings. As shown, the pool filter cleaner 10 includes first and second elongated delivery pipes, 38, 14, respectively. Referring to FIG. 3, the first elongated pipe 38 has opposed upper and lower ends 40, 42, respectively, and the second elongated pipe 14 has opposed upper and lower ends 16, 18, respectively, each of which may be threaded, as shown.

A hose connector 46 is provided, the hose connector 46 preferably being substantially T-shaped. The hose connector 46 has a hose attachment port 48 adapted for releasable attachment to an external water supply hose H, along with first and second ports 45, 47. The upper end 40 of the first elongated pipe 38 is secured to the first port 45, as shown.

It should be understood that hose attachment ports are well-known in the art, and any suitable type of hose attachment port may be used for releasable connection external hose H, which may be a conventional garden hose or the like. The hose attachment port 48 may include a valve or clamp, as is conventionally known, for selectively controlling fluid flow therethrough. Further, any suitable attachment between the upper end 40 of the pipe 38 and the first port 45 may be utilized, such as the releasable, threaded attachment illustrated in FIG. 3.

A water inlet pipe or cross pipe 50 is provided, the cross pipe 50 having opposed first and second ends 51, 53, respectively. The first end 51 is attached to the second port 47 of the hose connector 46. It should be understood that any suitable attachment between the first end 51 of the cross pipe and the second port 47 of the hose connector 46 may be utilized, such as the releasable, threaded attachment illustrated in FIG. 3. The second end 53 of the cross pipe 50 is attached to a substantially L-shaped elbow 52, having first and second fluid openings 55, 57, respectively. The second end 53 of the cross pipe 50 is attached to the first fluid opening 55, and the upper end 16 of the second elongated pipe 14 is attached to the second fluid opening 57, as shown, preferably by the releasable threaded interconnections illustrated in FIG. 3, although it should be understood that any suitable type of attachment may be utilized.

It should be understood that the pool filter F shown in FIGS. 1 and 2 is shown for exemplary purposes only. The overall dimensions of the pool filter cleaner 10 may vary, depending upon the particular size and shape of the pool filter to be cleaned. For a conventional cylindrical pool filter, such as that shown in the drawings, the first elongated pipe 38 and the second elongated pipe 14 may each have a length of twenty inches, for example, and a diameter of approximately ⅞ of an inch. Using these exemplary dimensions, the cross pipe 50 may have a length of approximately eleven inches, also with a diameter of approximately ⅞ of an inch. Pipes 38, 14, 50 may be formed from polyvinyl chloride (PVC) or any other suitable corrosion-resistant material.

A sprinkler head 44 is mounted on the lower end 42 of the first elongated pipe 38. The sprinkler head 44 is preferably releasably attached to the first pipe 38 via threaded engagement therewith, although it should be understood that any suitable type of attachment may be utilized. The sprinkler head 44 may be any suitable type of water sprinkler head, but is preferably a cylindrical sprinkler head that emits jets of water normal to its axis and has apertures radially spaced apart about its circumference to simultaneously spray the 360° inner surface of the cylindrical pool filter F. Similarly, a nozzle 22, which may be any suitable type of water-spraying nozzle, is provided for mounting on the lower end 18 of second elongated pipe 14. Preferably, a second elbow joint 20 is provided, having an upper end 21 releasably attached to the lower end 18 of second pipe 14 by threads or the like, and a lower end 23 releasably attached to the nozzle 22, also by threads or the like. It should be understood that any suitable type of attachment may be utilized.

Additionally, a cap 30 is mounted on the first elongated pipe 38, the cap 30 being adapted for covering and sealing an upper opening formed through the pool filter F leading into the central passage 12 through the filter F. As shown in FIG. 2, the cap 30 preferably has an upper portion 32, a lower portion, 34, and an annular ring 36 between the upper and lower portions. Using the exemplary dimensions given above, the annular ring 36 may have an external diameter of approximately eight inches. The pipe 38 may slide up and down through the cap 30, and may be rotated within the cap 30 so that the sprinkler head and the nozzle 22 may be raised and lowered to direct their spray against the upper and lower portions of the filter F, and so that the nozzle 22 may be rotated to direct its spray around the exterior of the filter F, as desired.

In use, the sprinkler head 44 and a lower portion of the first elongated pipe 38 are inserted within the central passage 12 of the pool filter F through the upper opening, with the cap 30 covering and sealing the upper opening of passage 12. As shown in FIG. 1, in the fully lowered position, the lower portion 34 of the cap 30 is fully received within the central passage 12, and the annular ring 36 covers and seals the upper opening, maintaining the cap 30 in position by friction fit or otherwise. Using the exemplary dimensions given above, the lower portion 34 may have a diameter of approximately four inches, and the cap 30 has an overall circular cross-sectional contour.

In this lowered position, the nozzle 22 and a lower portion of the second elongated pipe 14 are supported external to the pool filter F. Preferably, a support bar 24 is provided, the support bar having opposed first and second ends 25, 27. A circular opening 28 is formed through the support bar 24 adjacent the first end 25, allowing for sliding reception of first elongated pipe 38. Preferably, the first end 25 is attached to the upper portion 32 of the cap 30. A second circular opening 26 is preferably formed through the support bar 24 adjacent the second end 27 for sliding reception of the second elongated pipe 14. Using the exemplary dimensions given above, the support bar 24, which may be a substantially rectangular bar, may have a length of approximately eleven inches and a width of approximately three inches.

Pressurized water supplied through the external hose H jets from the sprinkler head 38 and the nozzle 22 to simultaneously clean the interior surface and the exterior surface, respectively, of the pool filter F. With the cap 30 firmly positioned to cover the upper end of passage 12 of filter F, the user may move the first and second elongated pipes 38, 14 in an up-and-down manner, thus allowing the sprinkler head 38 and the nozzle 22 to project water along the entire vertical heights of the interior and exterior surfaces of the filter F. Additionally, the user may rotate the cleaner 10 about the entire circumference of filter F, maintaining this up-and-down motion to completely clean the interior and exterior surfaces. A separate drip tray or base may be provided under the pool filter F, for collecting the water sprayed by sprinkler head 38 and nozzle 22 (using the exemplary dimensions given above, the drip tray may have a diameter of approximately ten inches).

Although the pool filter cleaner 10 has been described as being made from discrete components releasably joined by threaded joints, it will be apparent that the pool filter cleaner 10 may also be formed by a molded, one-piece plastic conduit, by soldered copper tubing, or by other rigid construction that forms an inverted U-shaped conduit having two parallel delivery pipes joined by a water inlet pipe, the water inlet pipe having a hose connector 45 at one end for attachment to a water supply under pressure, one delivery pipe terminating in a sprinkler head 44 as described above, and the other delivery pipe terminating in a nozzle 22 extending normal to the pipe to face the sprinkler head 44.

Figure 4:
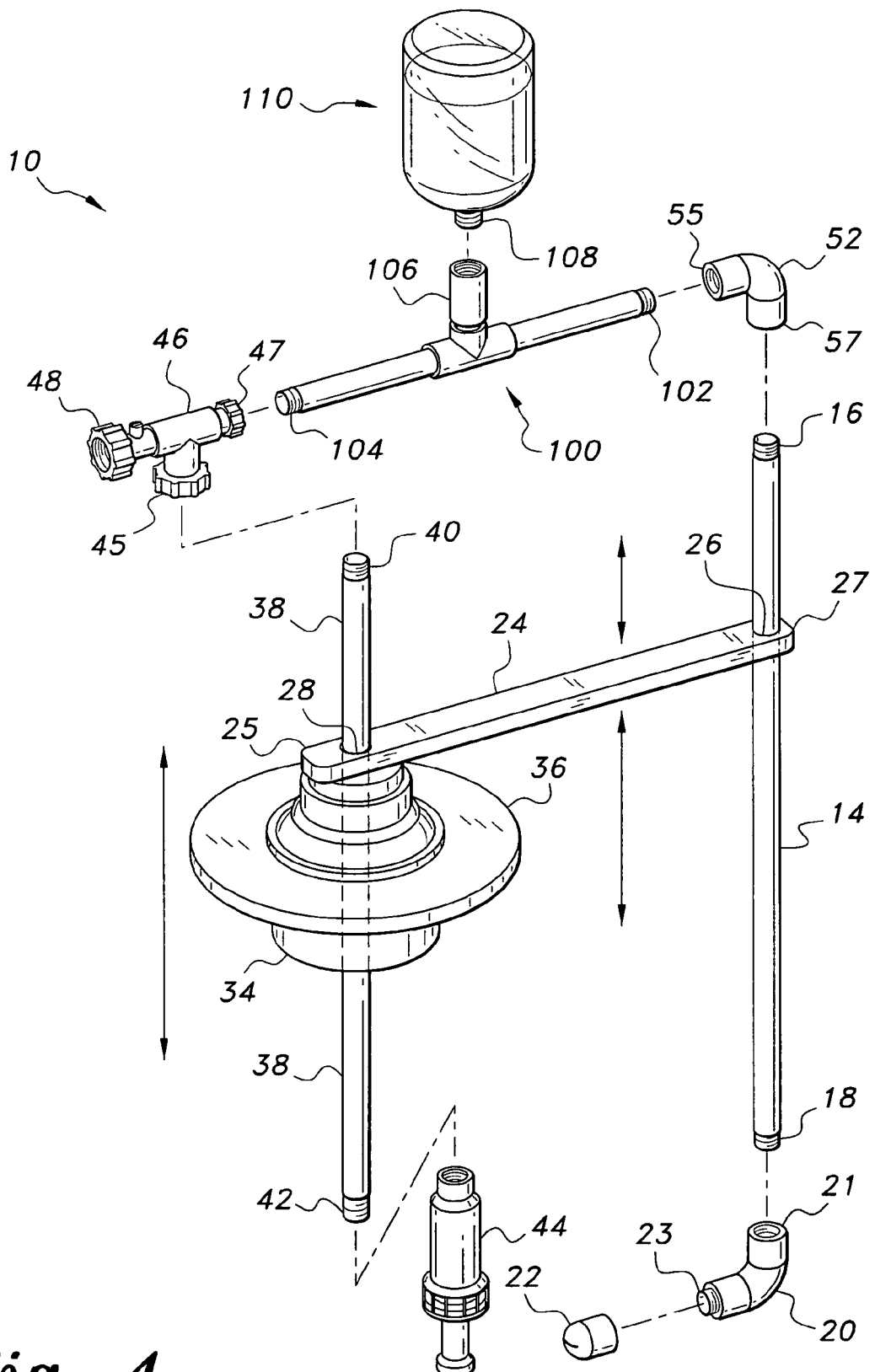
FIG. 4 is an exploded view of an alternative embodiment of a pool filter cleaner according to the present invention.

In the alternative embodiment of FIG. 4, an additional coupler 100 has been added, allowing for interconnection to a bottle 110 containing a cleaning solution. Preferably, as shown in FIG. 4, the coupler 100 replaces cross pipe 50, although it should be understood that the coupler 100 may be used in combination with one or more shortened cross pipes. The coupler 100 is preferably a T-shaped connector, similar to the hose connector 46, with a first open coupler end 104, which is preferably threaded, similar to the first end 51 of the cross pipe 50, for releasable attachment to the second port 47 of the hose connector 46. Similarly, a second open coupler end 102 of coupler 100 is preferably externally threaded, similar to the second end 53 of the cross pipe 50, allowing for interconnection with the elbow 52. As shown, the coupler 100 has a port 106, which is preferably a female, internally threaded coupling, dimensioned and configured to receive the threaded open end 108 of the bottle 110.

It should be understood that the bottle 110 is shown for exemplary purposes only, and may be any suitable type of container for housing any desired type of cleaning fluid or solution. Preferably, the port 106 includes a drip-type coupling or filter, so that the fluid from the bottle 110 does not completely empty into the water stream provided by hose H, but rather drips into the water stream. A valve for controlling the volume of cleaning solution may be further integrated into the coupling of port 106. In use, the user may either use the system without the coupler 100, as in the embodiment of FIG. 3, or may easily add the coupler 100, as in FIG. 4, by replacing cross pipe 50 therewith, depending upon whether the user wishes to add cleaning solution to the water.

It is to be understood that the present invention is not limited to the embodiments described above, but encompasses any and all embodiments within the scope of the following claims.

I claim:
1. A pool filter cleaner, comprising:
an elongated water inlet pipe having first and second ends;

a hose connector adapted for connection to a supply of water under pressure, the hose connector being attached to the first end of the water inlet pipe;

a first elongated water delivery pipe extending normal to the second end of the water inlet pipe;

a second elongated water delivery pipe extending from the water inlet pipe adjacent the first end of the water inlet pipe and parallel to the first water delivery pipe, the water inlet pipe and the first and second water delivery pipes forming a substantially U-shaped conduit;

a sprinkler head attached to the end of the second water delivery pipe opposite the water inlet pipe;

a nozzle extending normal to the end of the first water delivery pipe opposite the water inlet pipe, the nozzle being directed towards the sprinkler head; and a cap disposed around the second water delivery pipe between the water inlet pipe and the sprinkler head, the cap being adapted for forming a seal against one end of a cylindrical pool filter when the second water delivery pipe extends at least partially through the pool filter, the first water delivery pipe being external to the pool filter.

2. The pool filter cleaner as recited in claim 1, wherein said hose connector comprises a substantially T-shaped coupler having first and second ports, the first port being adapted for releasable connection to an upper end of the second elongated water delivery pipe, the second port being adapted for releasable connection to the first end of the water inlet pipe, said hose connector further comprising a hose attachment port adapted for releasably receiving an external hose.

3. The pool filter cleaner as recited in claim 1, wherein said cap is slidably mounted on the second elongated water delivery pipe.

4. The pool filter cleaner as recited in claim 3, further comprising a support bar slidably mounted on, and extending between, said first and second elongated water delivery pipes.

5. The pool filter cleaner as recited in claim 4, wherein the support bar has a pair of longitudinally opposed openings formed therethrough, said first and second elongated water delivery pipes extending through the openings in the support bar.

6. The pool filter cleaner as recited in claim 5, wherein the support bar is attached, at one end thereof, to an upper end of said cap.

7. The pool filter cleaner as recited in claim 1, wherein the sprinkler head is releasably attached to the second elongated water delivery pipe.

8. The pool filter cleaner as recited in claim 1, wherein the nozzle is releasably attached to the first elongated water delivery pipe.

9. The pool filter cleaner as recited in claim 1, further comprising a first elbow attachment, the first elbow attachment coupling the second end of the water inlet pipe to the first elongated water delivery pipe.

10. The pool filter cleaner as recited in claim 1, further comprising a second elbow attachment, the second elbow attachment releasably coupling the nozzle to the first elongated water delivery pipe.

11. The pool filter cleaner as recited in claim 1, wherein said elongated water inlet pipe has a coupler port formed substantially centrally therethrough, the coupler port being adapted for releasable connection to an external supply of cleaning solution.

12. A pool filter cleaner, comprising:

an elongated water inlet pipe having first and second ends;

a hose connector adapted for connection to a supply of water under pressure, the hose connector being attached to the first end of the water inlet pipe;

a first elongated water delivery pipe extending normal to the second end of the water inlet pipe;

a second elongated water delivery pipe extending from the water inlet pipe adjacent the first end of the water inlet pipe and parallel to the first water delivery pipe, the water inlet pipe and the first and second water delivery pipes forming a substantially U-shaped conduit;

a sprinkler head releasably attached to the end of the second water delivery pipe opposite the water inlet pipe;

a nozzle releasably attached to, and extending normal to, the end of the first water delivery pipe opposite the water inlet pipe, the nozzle being directed towards the sprinkler head; and a cap disposed around the second water delivery pipe between the water inlet pipe and the sprinkler head, the cap being adapted for forming a seal against one end of a cylindrical pool filter when the first water delivery pipe extends at least partially through the pool filter, the first water delivery pipe being external to the pool filter.

13. The pool filter cleaner as recited in claim 12, wherein said hose connector comprises a substantially T-shaped coupler having first and second ports, the first port being releasably connected to an upper end of the second elongated water delivery pipe, the second port being releasably connected to the first end of the water inlet pipe, said hose connector further comprising a hose attachment port adapted for releasably receiving an external hose.

14. The pool filter cleaner as recited in claim 12, wherein said cap is slidably mounted on the second elongated water delivery pipe.

15. The pool filter cleaner as recited in claim 14, further comprising a support bar slidably mounted on, and extending between, said first and second elongated water delivery pipes.

16. The pool filter cleaner as recited in claim 15, wherein the support bar has a pair of longitudinally opposed openings formed therethrough, said first and second elongated water delivery pipes extending through the openings in the support bar.

17. The pool filter cleaner as recited in claim 16, wherein the support bar is attached, at one end thereof, to an upper end of said cap.

18. The pool filter cleaner as recited in claim 12, further comprising a first elbow attachment releasably coupling the second end of the water inlet pipe to the first elongated water delivery pipe.

19. The pool filter cleaner as recited in claim 12, further comprising a second elbow attachment releasably coupling the nozzle to the first elongated water delivery pipe.

20. The pool filter cleaner as recited in claim 12, wherein said elongated water inlet pipe has a coupler port formed substantially centrally therethrough, the coupler port being adapted for releasable connection to an external supply of cleaning solution.

* * * * *